UNITED STATES PATENT OFFICE.

LEWIS SOLOMON, OF NEW YORK, N. Y.

IMPROVEMENT IN TREATING AURIFEROUS AND ARGENTIFEROUS PYRITES.

Specification forming part of Letters Patent No. 22,587, dated January 11, 1859.

*To all whom it may concern:*

Be it known that I, LEWIS SOLOMON, of the city of New York, in the county and State of New York, have invented a new and Improved Method of Extracting Gold and Silver from Auropyritous Ores; and I do hereby declare that the following is a full, clear, and exact description thereof.

My invention relates more especially to the extraction of the precious metals from the auriferous and argentiferous pyrites or sulphurets of copper, iron, arsenic, &c. As heretofore treated, from the imperfect manner of desulphurizing and amalgamating these ores, the operators have been enabled to recover or reclaim but a very small percentage of the precious metals contained in them—on the average about ten per cent.

My invention consists in a new and improved process of extracting the precious metals from their ores by which a much greater percentage is obtained than heretofore.

In my process I do not claim the use of chloride of sodium with the crude ore during the process of roasting or the application of heat during the process of amalgamation or the use of a hydrated solution of sulphate of iron for the purpose of precipitating the gold from its chlorides separately considered, but only when used in connection with each other and with wood-ashes and soda-ash and other things, in the manner and for purposes to be hereinafter described.

To enable others to use my process, I will proceed to describe it more fully, merely premising it with the statement that I intend to use it in connection with an apparatus invented by myself, which I consider more suitable for carrying it economically into effect than any other as heretofore constructed.

The ore is first stamped or broken fine in any of the well-known machines for that purpose and passed through a sieve of about twenty-eight meshes to the inch, such portions as are too large to pass the meshes being again returned to the stamps for further crushing, after which about four per centum, by weight, of chloride of sodium is added and mixed or thoroughly incorporated with the ore by being passed through a buhrstone mill. This mixture thus prepared is then placed in a furnace for roasting, care being taken during the first three or four hours not to exceed a dull red heat, so as to avoid volatilization of the precious metals, after which time, however, it may be raised at intervals to a higher degree, until all the sulphurous and muriatic vapors formed are expelled, the ore for this purpose being occasionally stirred so as to expose it more thoroughly to the action of the flame and air. When no further sulphurous or hydrochloric vapors rise from the ore, it may be withdrawn from the furnace and allowed to cool. The ore is then ground in the usual manner with about three per centum, more or less, of wood-ash and bolted fine. The wood-ash serves to separate and keep apart the particles of ore and make it work free, and at the same time assists in cleansing the metallic particles. The mass thus prepared is now ready to be placed in the machine for the process of amalgamation, when a sufficient quantity of water is added (and which may be estimated by weight) to reduce the mass to a pasty consistency, suitable to cause the mercury to separate into globules and filter through it, instead of passing through in a body. One per centum of soda-ash is also added, to cleanse the mercury and minute metallic particles of all earthy and greasy substances, so as to increase their affinity for each other. I then add about fifty pounds of one-inch-square bar-iron in each chamber of the machine, in pieces of about three inches in length, which I consider the best form and size for trituration, and which will also have the effect of decomposing the chloride of silver, should any have been formed during the previous operations. The machine is then put in motion until these several ingredients are thoroughly incorporated, which will take from one and a half to two hours. Then pour about two hundred pounds of mercury into each chamber of the machine and set in motion at the rate of eight or ten revolutions per minute for about sixteen hours, in which time the free gold will be all taken up by the mercury. During this time heat has been applied to the apparatus, so as to raise the temperature of the mass to about 130° to 150° Fahrenheit, in order to expand the mercury and increase its affinity for the gold. In this process, in order to incorporate the ore and mercury more thoroughly, I place ten, twelve, or more six-pound shots in each chamber of the machine, which act as triturators of the mass, and which, with the heat above mentioned, have the effect of preventing the formation of the protochloride of mercury, which might otherwise appear. At the end of this time—that is, about fourteen or sixteen hours—one and a quarter pounds of sulphate of iron in solution is added to the contents of each chamber to decompose the chloride of gold, if any has been formed, and precipitate it in the metallic state, in which condition it is taken up by the mercury, the chambers being again closed and set in motion, as before, for about four hours, or until that result is produced. The consistency of the mass is then reduced by adding water, which for this purpose may be previously heated on the top or in the upper part of the heated chamber in which the machine is rotated, when they are again put in motion for about an hour, or until the globules of mercury shall collect in a body, when it is drawn off from the mass and the residuum subjected to a washing process, to separate the remaining mercury from the ore, after which the mercury may be separated from the gold by any process of straining and evaporation now known.

I do not intend to confine myself to the specific times and proportions mentioned in the foregoing specification, these being merely incidental to and not of the essence of the invention; but

What I claim as new, and desire to secure by Letters Patent, is—

1. Extracting gold and silver from auriferous and argentiferous pyrites, in the manner substantially as herein set forth.

2. The application of wood-ashes to the roasted ore during the process of grinding and of soda-ash, for the purposes specified.

In testimony whereof I have hereunto set my hand, before two subscribing witnesses, this 9th day of November, A. D. 1858.

LEWIS SOLOMON.

Witnesses:
   ISAAC JACOB,
   EDWARD JOSEPHIS.